US012424933B2

United States Patent
Aubineau et al.

(10) Patent No.: US 12,424,933 B2
(45) Date of Patent: Sep. 23, 2025

(54) POWER CONSUMPTION CONTROL OF AN ELECTRONIC SYSTEM AND APPARATUS FOR CONTROLLING THE POWER CONSUMPTION

(71) Applicant: NXP USA, Inc., Austin, TX (US)

(72) Inventors: Vincent Aubineau, Issy-les-MoulineauxFR (FR); Michael Andreas Staudenmaier, Munich (DE); Sebastien Haezebrouck, Antibes (FR)

(73) Assignee: NXP USA, Inc., Austin, TX (US)

( * ) Notice: Subject to any disclaimer, the term of this patent is extended or adjusted under 35 U.S.C. 154(b) by 234 days.

(21) Appl. No.: 18/449,059

(22) Filed: Aug. 14, 2023

(65) Prior Publication Data
US 2024/0063714 A1 Feb. 22, 2024

(30) Foreign Application Priority Data
Aug. 16, 2022 (EP) .................................... 22306224

(51) Int. Cl.
*H02M 3/04* (2006.01)
(52) U.S. Cl.
CPC ..................................... *H02M 3/04* (2013.01)
(58) Field of Classification Search
CPC ....................................................... H02M 3/04
See application file for complete search history.

(56) References Cited

U.S. PATENT DOCUMENTS

| | | | |
|---|---|---|---|
| 9,857,859 B2 | 1/2018 | Morning-Smith et al. | |
| 2008/0284389 A1 | 11/2008 | Kawase et al. | |
| 2014/0266293 A1 | 9/2014 | Ye et al. | |
| 2016/0118906 A1* | 4/2016 | Freeman | H02M 3/33515 363/21.05 |
| 2017/0070195 A1* | 3/2017 | Arknæs-Pedersen | H03F 3/187 |
| 2017/0099011 A1* | 4/2017 | Freeman | H02M 7/06 |
| 2019/0004579 A1* | 1/2019 | Allen-Ware | G06F 1/3228 |
| 2020/0097245 A1* | 3/2020 | Gonzalez | H04L 12/40 |
| 2021/0382805 A1 | 12/2021 | Gendler et al. | |
| 2023/0108091 A1 | 4/2023 | Aubineau et al. | |

FOREIGN PATENT DOCUMENTS

DE 102014214801 A1 1/2015

* cited by examiner

*Primary Examiner* — Rafael O De León Domenech

(57) ABSTRACT

Methods, systems, and apparatus for power consumption control in an electronic system is disclosed. A voltage of a voltage rail coupled between a power management system and the electronic system to a power consumption trigger voltage is compared. Based on the voltage of the voltage rail being below the power consumption trigger voltage, power consumption by the electronic system is increased to reduce the voltage of the voltage rail during a power down of the electronic system. A voltage output by a power source which is provided as an input to the power management system is detected to be at a nominal voltage after increasing the power consumption. Based on the detection, a regulated voltage is provided to the voltage rail to power up the electronic system.

20 Claims, 4 Drawing Sheets

POWER CONSUMPTION CONTROL OF AN ELECTRONIC SYSTEM AND APPARATUS FOR CONTROLLING THE POWER CONSUMPTION

CROSS-REFERENCE TO RELATED APPLICATIONS

This application claims the priority under 35 U.S.C. § 119 of European Patent application no. 22306224.1, filed on 16 Aug. 2022, the contents of which are incorporated by reference herein.

FIELD OF USE

This disclosure generally relates to power consumption control, and more particularly to power consumption control of an electronic system after a voltage drop event.

BACKGROUND

A power management system is used to control electrical power provided to electronic systems, e.g., System-on-Modules (SoMs), System-on-Chips (SoCs), Microcontroller Units (MCUs), etc. For example, a power management system receives power from a voltage source and manages power-up and power-down of the electronic system based on the voltage source. However, in some cases after a voltage drop event associated with a voltage output by the voltage source, e.g., a battery power loss, the power management system fails to properly perform a power-down or power-up of the electronic system, which extends a time before the electronic system is available for use.

SUMMARY

In accordance with a first aspect of the present disclosure, a method for power consumption control in an electronic system is conceived, the method comprising: comparing a voltage of a voltage rail coupled between a power management system and the electronic system to a power consumption trigger voltage; based on the voltage of the voltage rail being below the power consumption trigger voltage, increasing power consumption by the electronic system to reduce the voltage of the voltage rail during a power down of the electronic system; detecting that a voltage output by a power source which is provided as an input to the power management system is at a nominal voltage after increasing the power consumption; and based on the detection, providing a regulated voltage to the voltage rail to power up the electronic system.

In one or more embodiments, increasing the power consumption comprises one or more of increasing a clock rate of a subsystem of the electronic system, waking the subsystem of the electronic system from a reduced power state, and performing a read operation of a memory in the electronic system.

In one or more embodiments, increasing the power consumption comprises setting a register of the electronic system which indicates to the electronic system to increase the power consumption.

In one or more embodiments, the power consumption trigger voltage is above an upper threshold of a threshold voltage range and below the nominal voltage.

In one or more embodiments, the voltage output is below the power consumption trigger voltage in response to a voltage drop event associated with the power source.

In one or more embodiments, the voltage drop event is a loss of battery power associated with the voltage source.

In one or more embodiments, increasing the power consumption comprises performing only read operations from a memory by generating a write inhibit signal.

In one or more embodiments, based on the voltage output by the voltage source being at the nominal voltage after the power down, delaying to provide the regulated voltage to the electronic system, wherein the delay is less than if the power consumption was not increased during the power down.

In accordance with a second aspect of the present disclosure, a system is provided, comprising: a power management system; an electronic system arranged with a voltage sensing circuit and a power consumption control system; the voltage sensing circuit arranged to compare a voltage of a voltage rail coupled between the power management system and the electronic system to a power consumption trigger voltage; the power consumption control system arranged to increase power consumption by the electronic system based on the voltage being below the power consumption trigger voltage to reduce the voltage of the voltage rail during a power down of the electronic system; and the power management system arranged to detect that a voltage output of a power source which is input to the power management system is at a nominal voltage after increasing the power consumption; and based on the detection, providing a regulated voltage to the voltage rail to power up the electronic system.

In one or more embodiments, the power consumption control system arranged to increase the power consumption comprises the power consumption control system arranged to one or more of increase a clock rate of a subsystem of the electronic system, wake the subsystem of the electronic system from a reduced power state, and perform a read operation of a memory in the electronic system.

In one or more embodiments, the power consumption control system arranged to increase the power consumption comprises the power consumption control system arranged to set a register of the electronic system which indicates to the electronic system to increase the power consumption.

In one or more embodiments, the power consumption trigger voltage is above an upper threshold of a threshold voltage range and below the nominal voltage.

In one or more embodiments, the voltage is below the power consumption trigger voltage in response to a voltage drop event associated with the power source.

In one or more embodiments, the voltage drop event is a loss of battery power associated with the voltage source.

In one or more embodiments, the power consumption control system arranged to increase the power consumption comprises performing only read operations from a memory by generating a write inhibit signal.

In one or more embodiments, based on the voltage output of the voltage source being at the nominal voltage after the power down, delaying to provide the regulated voltage to the electronic system, wherein the delay is less than if the power consumption was not increased during the power down.

In accordance with a third aspect of the present disclosure, an electronic system is provided, comprising: a power consumption control system; an application circuit; wherein the power consumption control system is arranged to receive an indication of a voltage of a voltage rail being below the power consumption trigger voltage during a power down of the electronic system and to send a signal to the application circuit; wherein the application circuit is arranged to increase power consumption of the electronic system in response to the signal during the power down to reduce the voltage of the voltage rail.

In one or more embodiments, the power consumption control system arranged to increase the power consumption comprises the power consumption control system arranged to one or more of increase a clock rate of a subsystem of the electronic system, wake the subsystem of the electronic system from a reduced power state, and perform a read operation of a memory in the electronic system during the power down.

In one or more embodiments, the voltage is below the power consumption trigger voltage in response to a voltage drop event of a voltage output by a voltage source, the voltage output provided as an input of the power management system.

In one or more embodiments, based on the voltage of the voltage source being at the nominal voltage after the power down, delaying to provide the regulated voltage to the electronic system, wherein the delay is less than if the power consumption was not increased during the power down.

Figure 1:
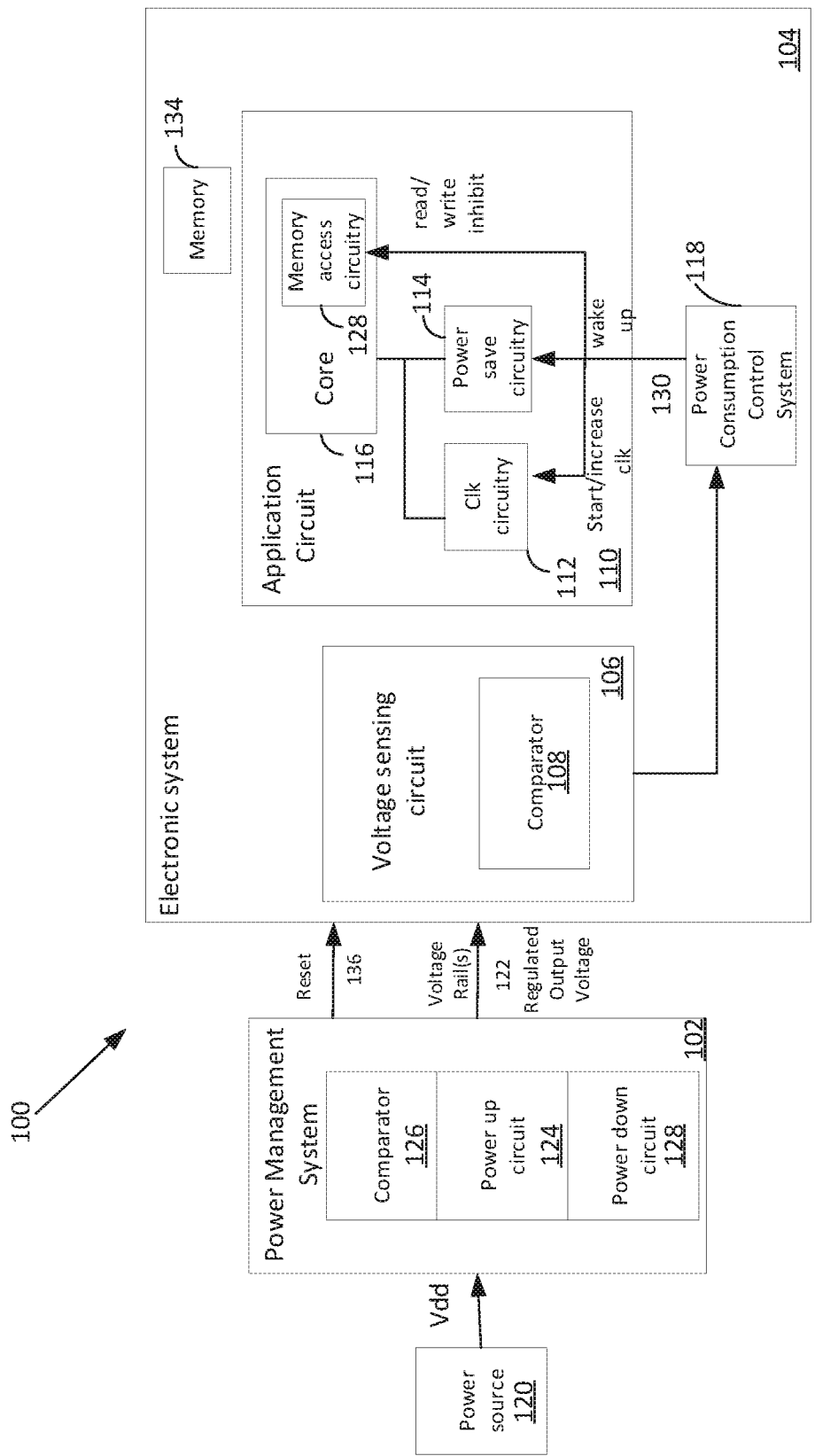
FIG. 1 is a block diagram of an example electronic system coupled to a power management system in accordance with an embodiment.

The drawings are for the purpose of illustrating example embodiments, but it is understood that the embodiments are not limited to the arrangements and instrumentality shown in the drawings.

DETAILED DESCRIPTION

Methods, systems, and apparatus are disclosed which relate to power consumption control of an electronic system after a voltage drop event.

Overview

A power management system receives as an input a voltage output from a voltage source and provides one or more regulated voltages to an electronic system (e.g., System-on-Modules (SoMs), System-on-Chips (SoCs), Microcontroller Units (MCUs)). In an example, each regulated voltage may be carried over a respective voltage rail coupled between the power management system and the electronic system. A voltage drop event occurs when the voltage output from the voltage source drops below a nominal voltage. In some embodiments, when a corner case event (a problem outside normal operating parameters) occurs that results in the voltage drop event, the power management system performs a power down of the electronic system followed by a power up of the electronic system. A voltage of the voltage rail coupled between the power management system and the electronic system needs to be below a lower threshold of a threshold voltage range defined by the lower threshold and upper threshold such that the electronic system is not in an unknown state representative of, for example, a high probability of permanent hang, a corrupted register, or unpredictable behavior after the regulated voltage is again provided to the voltage rail. The power management system will wait for a variable wait time before providing the regulated voltage to the voltage rail to power up the electronic system. The wait time depends on a time that it takes for the voltage on the voltage rail defined by a capacitance associated with the voltage rail to discharge to below the lower threshold. At the end of the wait time, the power management system applies the regulated voltage to the voltage rail.

Embodiments disclosed herein are directed to reducing the wait time before a regulated voltage of one or more regulated voltages is applied to a voltage rail during the power up of the electronic system after the power down. The power management system or the electronic system compares a voltage of the voltage rail to a power consumption trigger voltage which is greater than the upper threshold of the threshold voltage range and below the regulated voltage. Based on an indication that the voltage of the voltage rail is below the power consumption trigger voltage, a power consumption control system of the electronic system increases power consumption of an application circuit of the electronic system to accelerate reduction of the voltage on the voltage rail. The power consumption is increased because a voltage drop event has occurred and the power management system will power down the electronic system. The increase in power consumption results in a shorter wait time before power up of the electronic system by the power management system when the voltage output from the voltage source drops returns to the nominal voltage. The voltage on the voltage rail is reduced and less wait time is needed for the voltage on the voltage rail to fall below the lower threshold before the regulated voltage is applied to the power rail to power up the electronic system. Well known instructions, protocols, structures, and techniques have not been shown in detail in order not to obfuscate the description.

Example Systems

FIG. 1 is a block diagram of a system 100 comprising an example electronic system 104 coupled to a power management system 102 in accordance with an embodiment. The electronic system 104 and the power management system 102 may be each implemented using circuitry such as analog circuitry, mix signal circuitry, memory circuitry, logic circuitry, integrated circuitry, processing circuitry arranged to execute code stored in a memory to perform the disclosed functions, or combinations thereof. In other example, the power management system 102 and the electronic system 104 may include different components than what is shown or not be limited to the illustrated components.

The power management system 102 may receive a voltage output Vdd from a power source 120 at an input of the power management system 102 and output a regulated voltage. The power source 120 may be a power supply or a battery in an example and the regulated voltage may be a voltage output by the power management circuit such as 1.1 volts, 1.8 volts, or 3.3 volts in an example. A voltage rail 122 may form a connection between the power management system 102 and the electronic system 104. The power management system 102 may apply the regulated voltage to the voltage rail 122 to carry the regulated voltage from the power management system 102 to the electronic system 104. In an example, one or more voltage rails may be coupled between the power management system 102 and the electronic system 104 to carry a respective regulated voltage to the electronic system 104.

The electronic system 104 may be a System-on-Modules (SoMs), System-on-Chips (SoCs), Microcontroller Units (MCUs) etc. powered by the voltage rail 122. In an example, a voltage drop of the voltage output of the power source 120 from a nominal voltage, such as a result of a loss of battery or interruption of power to the power source 120 is a voltage drop event. The power management system 102 may initiate a power down of the electronic system 104 after the voltage drop event followed by a power up of the electronic system 104 after the voltage output returns to the nominal voltage (e.g., 5 volts). The power down performed by a power down circuit 128 may be a sequence of steps which is performed to power off the electronic system 104 to a power off state from a power on state and the power up performed by a power up circuit 124 may be a sequence of steps which is performed to power on the electronic system 104 from the power off state to the power on state.

During the power down, the power management system 102 no longer applies the regulated voltage to the voltage rail 122. Even though no regulated voltage is applied to the voltage rail 122, the voltage rail 122 may still have a certain voltage due to capacitance coupled to the voltage rail 122. The voltage of the voltage rail 122 may reduce over time due to inherent resistance of the voltage rail 122 or resistance coupled to the voltage rail 122 which discharges the capacitance. Before the power up of the electronic system 104, the power management system may wait for a wait time before applying the regulated voltage to the power rail 122 to power up the electronic system 104 so that the voltage on the voltage rail 122 discharges below a lower threshold of a threshold voltage range defined by the lower threshold and an upper threshold. Between the lower threshold and the upper threshold, the electronic system 104 may be in an unknown state representative of, for example, a high probability of permanent hang, a corrupted register, or unpredictable behavior and above the upper threshold and below the lower threshold the electronic system 104 may be in a known state. The power management circuit 102 may have a comparator 126 which receives the voltage of the voltage rail 122 or a voltage of a capacitor coupled to the voltage rail 122 and compares the voltage to the lower threshold voltage. A positive difference based on subtracting the lower threshold voltage from the voltage of the voltage rail 122 may be indicative of a wait time before the voltage of the voltage rail 122 typically discharges to below the lower threshold when the regulated output voltage is not applied to the voltage rail 122. The wait time may be proportional to the positive difference. The power management system 102 may delay, pause, hold, etc., application of the regulated voltage to the voltage rail 122 to power up the electronic system 104 for the wait time associated with the difference. The wait time allows time for the voltage on the voltage rail 122 to discharge to below the lower threshold and may prevent the electronic system 104 connected to the power management system 102 from becoming unusable in corner case events when the regulated voltage is applied to the voltage rail 122. After the wait time, the power up circuit 124 of the power management system 102 may provide the regulated voltage to the voltage rail 122 and to the electronic system 104 to power up the electronic system 104. In such an embodiment, the ability of the power management system 102 to wait allows the electronic system 104 to not be in the unknown state before the regulated voltage is applied to the voltage rail 122 and improves overall efficiency and performance of the power management system 102 and electronic system 104. In some examples, the power management system 102 may also provide a reset signal 136 to the electronic system 104 during the power up to cause the electronic system 124 to begin operation after the regulated voltage provided to the electronic system 104 stabilizes to further insure that the electronic system 104 is in a known state.

Embodiments disclosed herein are directed to reducing the wait time before the regulated voltage is applied to the voltage rail 122 before a power up of the electronic system 104 and after the power down. The electronic system 104 may have a voltage sensing circuit 106, a power consumption control system 118, and application circuitry 110. The voltage sensing circuit 106 may have a comparator 108 to compare a voltage of the voltage rail 122 to a power consumption trigger voltage which is greater than the upper threshold of the threshold voltage range and below the regulated voltage. The voltage of the voltage rail 122 being below this power consumption trigger voltage indicates that the power source 102 experienced a voltage drop event and the power management system 102 will initiate a power down. In an example, during this power down, the power consumption control system 118 increases power consumption of the application circuit 110 which accelerates discharge of the voltage on the voltage rail 122 during the power down. The acceleration results in a lower voltage on the voltage rail 122 and a shorter wait time before power up of the electronic system 104 when the voltage output from the power source 120 provided to the power management system 102 returns to the nominal voltage compared to if the discharge is not accelerated. In an example, the wait time depends on a time that it takes for the voltage on the voltage rail 122 defined by a capacitance associated with the voltage rail 122 to discharge to below the lower threshold.

The application circuit 110 may include circuitry to perform various functions such as wireless communications, radar, signal processing, image processing, etc. In an example, the application circuit 110 may comprise one or more of clock circuitry 112, a power-save circuitry 114, and a core circuit 116 which in examples may comprise a processor and associated integrated circuits such as memory access circuitry 128. In an example, the power consumption control system 118 may accelerate discharge of the voltage on the voltage rail 122 due to a capacitance associated with the voltage rail 122 by changing operation of the core 116 based on one or more of the clock circuit 112, the power-save circuit 114, and the memory access circuit 128 during the power down instead of or in addition to using resistive circuitry to reduce the voltage of the voltage rail 122.

In one example, the power consumption control system 102 may send a signal 130 to cause the power save circuit 114 to wake a subsystem of the application circuit 110 such as the processing core 116 from a power-save state such as a sleep state, deep sleep state, or hibernate state to consume additional power and reduce the voltage on the voltage rail 122. For instance, the signal may cause a bit to be set in a register (not shown) which results in the subsystem being awaken. Power to the subsystem which is in the sleep state, deep sleep, or hibernate state may be controlled by a power ungating process where if the register is set to a value which indicates that the subsystem is to be awaken a signal is applied to low leakage transistors (not shown) in an example to turn on power to the subsystem. The awaking of the subsystem may increase power consumption of the electronic system 104 and reduce the voltage of the voltage rail 122.

In another example, the power consumption control system 102 may send a signal 130 to cause a clock signal output by clock circuitry 112 to be provided to a subsystem of the application circuit 110 such as the processing core 116. For instance, the signal may cause a bit to be set in a register (not shown) which in turn causes a logic gate (not shown) such as an AND gate to receive a clock signal and a control signal and output the clock signal as a clock ungating process to the processing core 116. Providing the clock signal to the subsystem may increase power consumption of the electronic system 104 and reduce the voltage of the voltage rail 122.

In another example, the power consumption control system 118 may send a signal 130 to cause a clock signal output by clock circuitry 112 to be provided to a subsystem of the application circuit 110 such as the processing core 116 with a higher frequency. For instance, the signal may cause a bit to be set in a register (not shown) which results in the clock circuit 112 increasing a clocking frequency to increase speed of a subsystem such as the processing core 116 to increase power consumption of the electronic system 104 and reduce the voltage on the voltage rail 122. The clock circuitry 112 may have a clock divider ratio to control the clock frequency. The clock frequency may be increased for example by adjusting a clock divider ratio of the clock circuitry 112. Increasing the clock frequency may increase power consumption of the electronic system 104 and reduce the voltage of the voltage rail 122.

In yet another example, the power consumption control system 118 may send a signal 130 to cause a memory access circuit 128 to perform additional memory operations such as read operations from a memory 134 of the electronic system 104. For instance, the signal may cause a bit to be set in a register (not shown) which results in the memory access circuit 116 performing the read operations consuming additional power and reducing the voltage on the voltage rail 122. Performing the read operations may increase power consumption of the electronic system 104 and reduce the voltage of the voltage rail 122. In an example, the memory operation might not include any write operations which might corrupt data in the memory 134 because of the reduced voltage on the voltage rail 122 and potential that the electronic system 104 may enter into the unknown state. For example, the power consumption control system 130 may provide a signal such as a write inhibit to the memory access circuitry or memory 134 to inhibit write operations and only allow for performing read operations. Further the memory 134 may be external to the core 116 in an example which typically results in additional consumption of power.

The power consumption control system 118 may perform other actions as well to reduce the voltage on the voltage rail 122.

Figure 2:
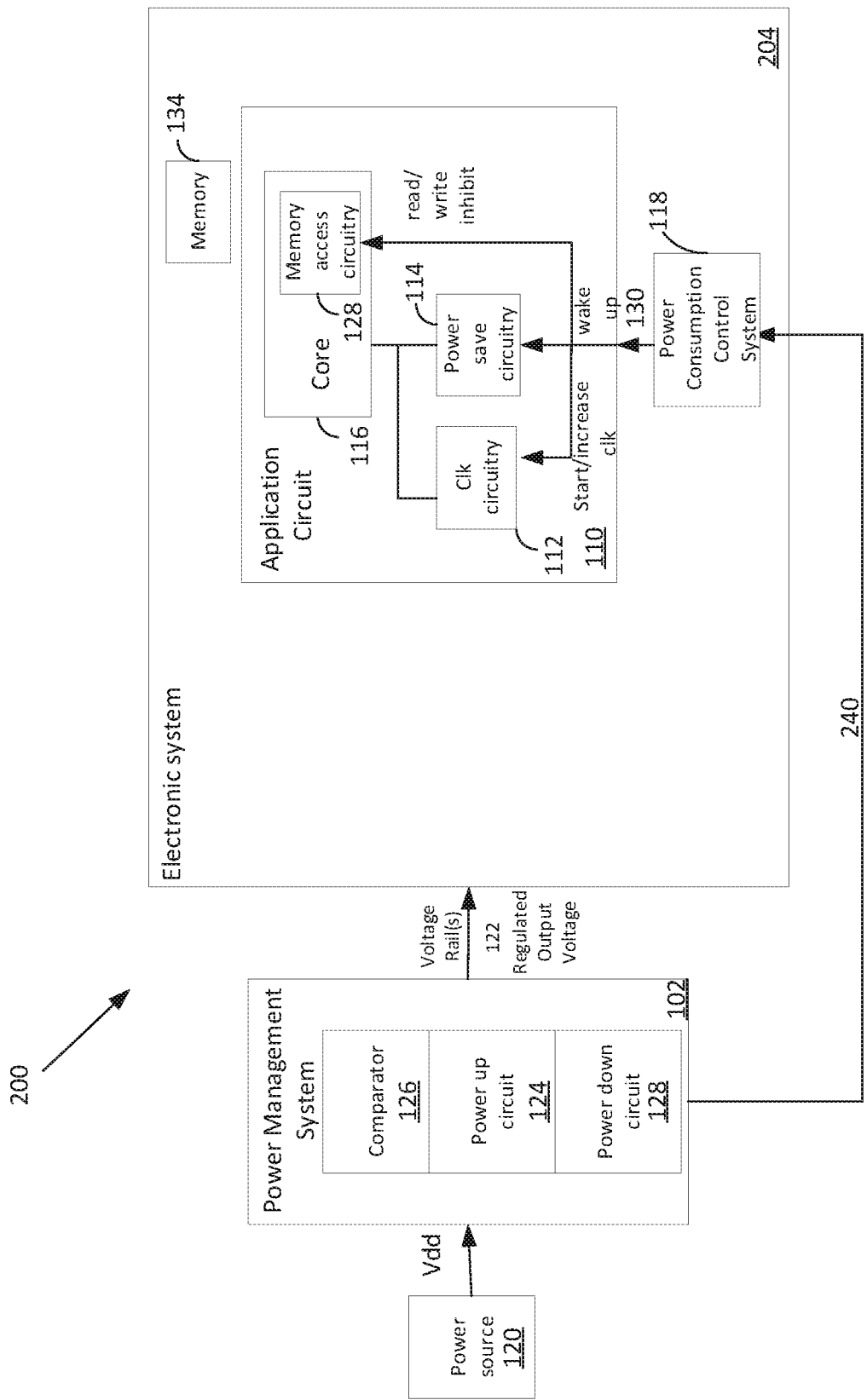
FIG. 2 is another block diagram of an example electronic system coupled to a power management system in accordance with an embodiment.

FIG. 2 is another block diagram of system 200 comprising an example electronic system 204 coupled to a power management system 102 in accordance with an embodiment. In power management system 102, the comparator 126 may determine that the voltage of the voltage rail 122 is below the power consumption trigger voltage during a power down after a voltage drop event rather than the electronic system 104 having the voltage sensing circuit 106 to perform this function. During the power down, the power management system 102 may provide a signal 240 to the power consumption control system 118 which indicates that the voltage of the voltage rail 122 is below the power consumption trigger voltage. In response, the power consumption control system 118 may provide the signal 130 to increase power consumption of the electronic system 204 and reduce the voltage on the voltage rail 122 in accordance with the embodiments described above.

Figure 3:
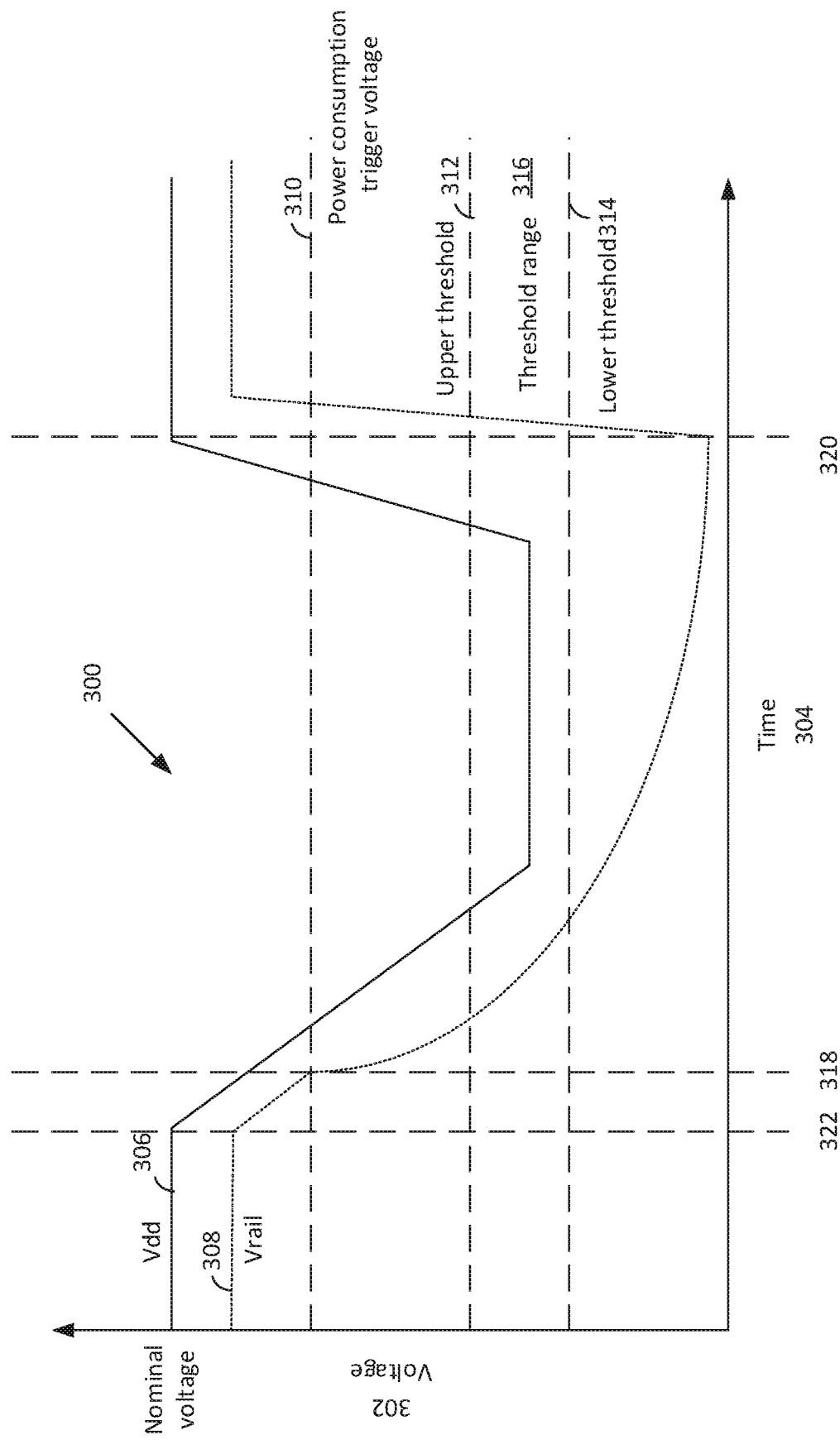
FIG. 3 depicts a graph of voltages that corresponds to operation of the power management system and the electronic system in accordance with an embodiment.

FIG. 3 depicts a graph 300 of voltage curves that corresponds to operation of the power management system 102 and the electronic system 104, 204 in accordance with an embodiment. The graph 300 illustrates voltage 302 along a y-axis and time 304 along an x-axis. The voltage curves that are illustrated include Vdd 306 which is a voltage Vdd of the power source 120 as a function of time and Vrail 308 which is a voltage on the voltage rail 122 as a function of time. The voltage of Vrail 308 may vary in accordance with the voltage of Vdd 306 such that voltage of the Vrail 308 may decrease with a voltage drop event of the Vdd 306. Further, the graph 300 illustrates a plurality of thresholds. The power management system 102 may experience a power loss event at time 322 indicated by a decrease in voltage of Vdd 306 from its nominal voltage which in turn results in the power management system 102 powering down. The voltage of Vrail 308 may decrease in response to the decrease in the voltage of Vdd 306. If the voltage of the Vrail 308 is less than a power consumption trigger voltage 310, then the electronic system 104, 204 may be arranged to consume more power to reduce the voltage on the voltage rail 122. At time 318, the voltage of the Vrail 308 may be equal to the power consumption trigger voltage 310 and the power consumption control system 102 is arranged to increase a rate of reduction of the voltage of the voltage rail 122 which is shown as an exponential decrease in voltage. For example, a clock ungating process or power ungating process may be performed in the application circuit 110 or the application circuit 110 may perform additional memory operations to increase the power consumption of the electronic system 104, 204 and reduce voltage on the voltage rail 122.

Voltages between an upper threshold voltage 312 and lower threshold voltage 314 may define a threshold voltage range 316 and indicate a voltage of the voltage rail 122 where the electronic system 104 may be in an unknown state. If the voltage of the voltage rail 122 is below the lower threshold voltage 312 or higher than the upper threshold voltage 314, then the electronic system 104 may be in a known state. The additional power consumption at time 318 results in the voltage of Vrail 310 falling below the lower threshold voltage 314 sooner than without the additional power consumption. If the voltage of Vdd 306 returns to the nominal voltage as shown at time 320, then the power management system 102 may perform a power up after the power down. The power management system 102 may apply the regulated voltage to the voltage rail 122 of the electronic system 104 during the power-up earlier than if a rate of reduction of the voltage of the voltage rail 308 is not increased with the additional power consumption.

Example Methods

Figure 4:
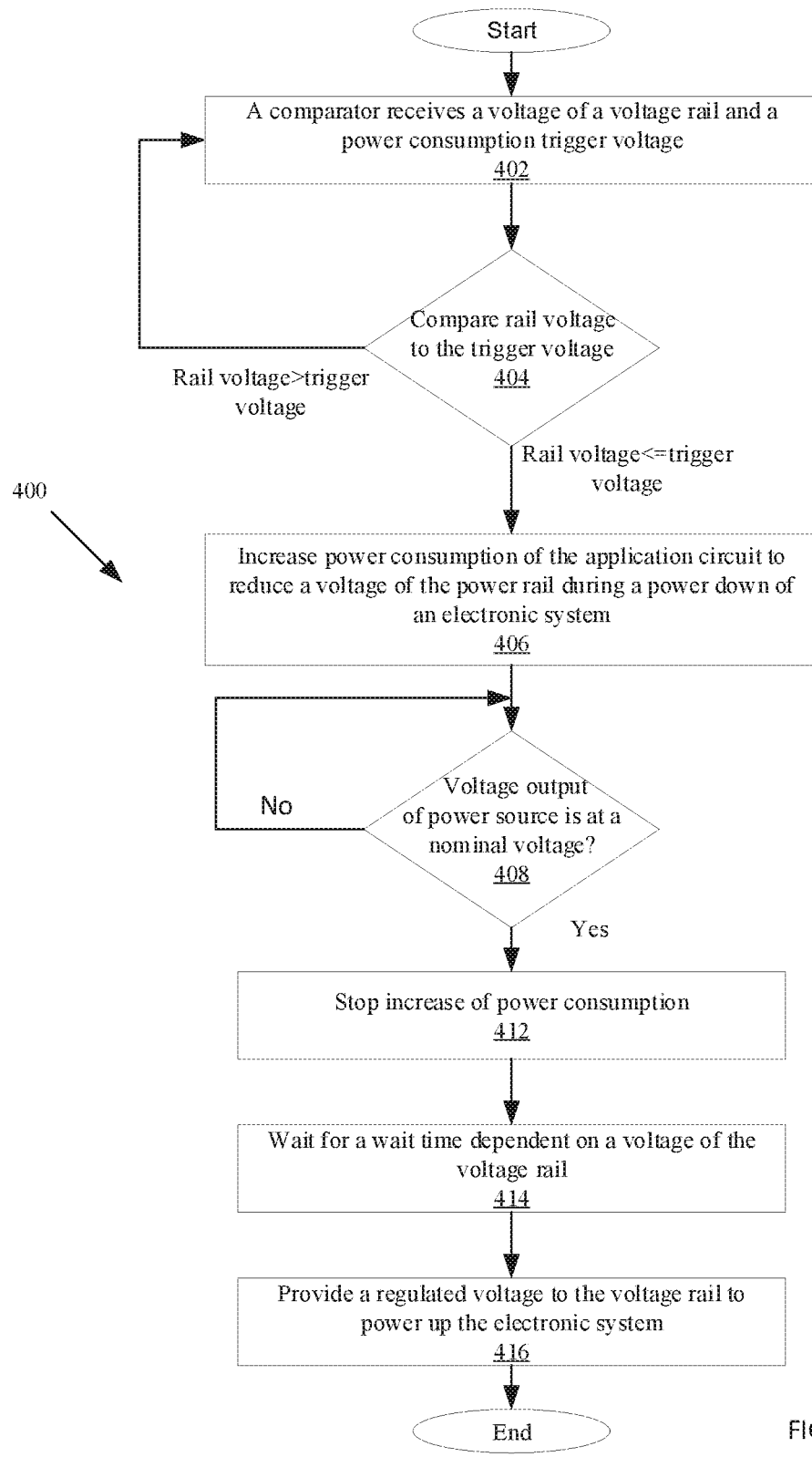
FIG. 4 is a flow chart of functions associated with operation of the electronic system coupled to the power management system in accordance with an embodiment.

FIG. 4 is a flow chart 400 of functions 402-416 associated with increasing a rate of reduction of the voltage on the voltage rail 122 in accordance with an embodiment. The functions 402-416 may be performed by the power consumption control system 118 and voltage sensing circuit 106 of the electronic system 104 in an example.

At 402, a comparator receives a voltage of a voltage rail 122 and an indication of a power consumption trigger voltage. If the voltage of the voltage rail is below the power consumption voltage, a voltage drop event occurred at the power management system 102 and the power management system 102 may perform a power down. Further, the comparator 126 may be associated with the power management system 102 or electronic system 204 in an example. At 404, the voltage of the voltage rail 122 is compared to the power consumption trigger voltage. If the voltage of the voltage rail 122 is greater than the power consumption trigger voltage, processing may return back to 402. If the voltage of the voltage rail 122 is less than or equal to the power consumption trigger voltage, the power management system 102 may perform a power down. At 406, a power consumption of the application circuit 110 is increased to reduce a voltage of the voltage rail 122 during the power down of the electronic system. The reduction may be performed in one or more ways such as ungating a clock to the application circuit 110 or ungating power to the application circuit 110 as discussed above among other ways and continue so long as the application circuit 110 is functional. At 408, a determination is made whether a voltage output of the power source 120 is at a nominal voltage. If the voltage output of the power source 120 is not at the nominal voltage, then processing may return to 408. If the voltage output of the voltage source is at the nominal voltage, then the power management circuit 104 stops increase of the power consumption at 412. At 414, power management circuit 104 may wait for a wait time dependent on the voltage of the voltage rail 122 which is less than if the electronic system 104 did not consume additional power during the power down. At 416, the regulated voltage is provided to the voltage rail 122 to power up the electronic system 104. In some examples, the regulated voltage may be provided immediately after the voltage output of the power source is at the nominal voltage instead of after a wait time. In other examples, the regulated voltage may be provided to the voltage rail 122 when the voltage of the voltage rail 122 is determined to be below the lower threshold. Other conditions are also possible for providing the regulated voltage.

In an embodiment, a method for power consumption control in an electronic system is disclosed. The method comprises: comparing a voltage of a voltage rail coupled between a power management system and the electronic system to a power consumption trigger voltage; based on the voltage of the voltage rail being below the power consumption trigger voltage, increasing power consumption by the electronic system to reduce the voltage of the voltage rail during a power down of the electronic system; detecting that a voltage output by a power source which is provided as an input to the power management system is at a nominal voltage after increasing the power consumption; and based on the detection, providing a regulated voltage to the voltage rail to power up the electronic system. In an example, increasing the power consumption comprises one or more of increasing a clock rate of a subsystem of the electronic system, waking the subsystem of the electronic system from a reduced power state, and performing a read operation of a memory in the electronic system. In an example, increasing the power consumption comprises setting a register of the electronic system which indicates to the electronic system to increase the power consumption. In an example, the power consumption trigger voltage is above an upper threshold of a threshold voltage range and below the nominal voltage. In an example, the voltage output is below the power consumption trigger voltage in response to a voltage drop event associated with the power source. In an example, the voltage drop event is a loss of battery power associated with the voltage source. In an example, increasing the power consumption comprises performing only read operations from a memory by generating a write inhibit signal. In an example, based on the voltage output by the voltage source being at the nominal voltage after the power down, delaying to provide the regulated voltage to the electronic system, wherein the delay is less than if the power consumption was not increased during the power down.

In another embodiment, a system is disclosed. The system comprises: a power management system; an electronic system comprising a voltage sensing circuit and a power consumption control system; the voltage sensing circuit arranged to compare a voltage of a voltage rail coupled between the power management system and the electronic system to a power consumption trigger voltage; the power consumption control system arranged to increase power consumption by the electronic system based on the voltage being below the power consumption trigger voltage to reduce the voltage of the voltage rail during a power down of the electronic system; and the power management system arranged to detect that a voltage output of a power source which is input to the power management system is at a nominal voltage after increasing the power consumption; and based on the detection, providing a regulated voltage to the voltage rail to power up the electronic system. In an example, the power consumption control system arranged to increase the power consumption comprises the power consumption control system arranged to one or more of increase a clock rate of a subsystem of the electronic system, wake the subsystem of the electronic system from a reduced power state, and perform a read operation of a memory in the electronic system. In an example, the power consumption control system arranged to increase the power consumption comprises the power consumption control system arranged to set a register of the electronic system which indicates to electronic system to increase the power consumption. In an example, the power consumption trigger voltage is above an upper threshold of a threshold voltage range and below the nominal voltage. In an example, the voltage is below the power consumption trigger voltage in response to a voltage drop event associated with the power source. In an example, the voltage drop event is a loss of battery power associated with the voltage source. In an example, the power consumption control system arranged to increase the power consumption comprises performing only read operations from a memory by generating a write inhibit signal. In an example, based on the voltage output of the voltage source being at the nominal voltage after the power down, delaying to provide the regulated voltage to the electronic system, wherein the delay is less than if the power consumption was not increased during the power down.

In yet another embodiment, an electronic system is disclosed. The electronic system comprises: a power consumption control system; an application circuit; wherein the power consumption control system is arranged to receive an indication of a voltage of a voltage rail being below the power consumption trigger voltage during a power down of the electronic system and to send a signal to the application circuit; wherein the application circuit is arranged to increase power consumption of the electronic system in response to the signal during the power down to reduce the voltage of the voltage rail. In an example, the power consumption control system arranged to increase the power consumption comprises the power consumption control system arranged to one or more of increase a clock rate of a subsystem of the electronic system, wake the subsystem of the electronic system from a reduced power state, and perform a read operation of a memory in the electronic system during the power down. In an example, the voltage is below the power consumption trigger voltage in response to a voltage drop event of a voltage output by a voltage source, the voltage output provided as an input of the power management system. In an example, based on the voltage of the voltage source being at the nominal voltage after the power down, delaying to provide the regulated voltage to the electronic system, wherein the delay is less than if the power consumption was not increased during the power down.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

The invention claimed is:

1. A method for power consumption control in an electronic system, the method comprising:
   comparing a voltage of a voltage rail coupled between a power management system and the electronic system to a power consumption trigger voltage;
   based on the voltage of the voltage rail being below the power consumption trigger voltage, increasing power consumption by the electronic system to reduce the voltage of the voltage rail during a power down of the electronic system;
   detecting that a voltage output by a power source which is provided as an input to the power management system is at a nominal voltage after increasing the power consumption; and
   based on the detection, providing a regulated voltage to the voltage rail to power up the electronic system.

2. The method of claim 1, wherein increasing the power consumption comprises one or more of increasing a clock rate of a subsystem of the electronic system, waking the subsystem of the electronic system from a reduced power state, and performing a read operation of a memory in the electronic system.

3. The method of claim 1, wherein increasing the power consumption comprises setting a register of the electronic system which indicates to the electronic system to increase the power consumption.

4. The method of claim 1, wherein the power consumption trigger voltage is above an upper threshold of a threshold voltage range and below the nominal voltage.

5. The method of claim 1, wherein the voltage output is below the power consumption trigger voltage in response to a voltage drop event associated with the power source.

6. The method of claim 5, wherein the voltage drop event is a loss of battery power associated with the voltage source.

7. The method of claim 1, wherein increasing the power consumption comprises performing only read operations from a memory by generating a write inhibit signal.

8. The method of claim 1, wherein based on the voltage output by the voltage source being at the nominal voltage after the power down, delaying to provide the regulated voltage to the electronic system, wherein the delay is less than if the power consumption was not increased during the power down.

9. A system comprising:
   a power management system;
   an electronic system arranged with a voltage sensing circuit and a power consumption control system;
   the voltage sensing circuit arranged to compare a voltage of a voltage rail coupled between the power management system and the electronic system to a power consumption trigger voltage;
   the power consumption control system arranged to increase power consumption by the electronic system based on the voltage being below the power consumption trigger voltage to reduce the voltage of the voltage rail during a power down of the electronic system; and
   the power management system arranged to detect that a voltage output of a power source which is input to the power management system is at a nominal voltage after increasing the power consumption; and based on the detection, providing a regulated voltage to the voltage rail to power up the electronic system.

10. The system of claim 9, wherein the power consumption control system arranged to increase the power consumption comprises the power consumption control system arranged to one or more of increase a clock rate of a subsystem of the electronic system, wake the subsystem of the electronic system from a reduced power state, and perform a read operation of a memory in the electronic system.

11. The system of claim 9, wherein the power consumption control system arranged to increase the power consumption comprises the power consumption control system arranged to set a register of the electronic system which indicates to the electronic system to increase the power consumption.

12. The system of claim 9, wherein the power consumption trigger voltage is above an upper threshold of a threshold voltage range and below the nominal voltage.

13. The system of claim 9, wherein the voltage is below the power consumption trigger voltage in response to a voltage drop event associated with the power source.

14. The system of claim 13, wherein the voltage drop event is a loss of battery power associated with the voltage source.

15. The system of claim 9, wherein the power consumption control system arranged to increase the power consumption comprises performing only read operations from a memory by generating a write inhibit signal.

16. The system of claim 9, wherein based on the voltage output of the voltage source being at the nominal voltage after the power down, delaying to provide the regulated voltage to the electronic system, wherein the delay is less than if the power consumption was not increased during the power down.

17. An electronic system comprising:
 a power consumption control system;
 an application circuit;
 wherein the power consumption control system is arranged to receive an indication of a voltage of a voltage rail being below the power consumption trigger voltage during a power down of the electronic system and to send a signal to the application circuit;
 wherein the application circuit is arranged to increase power consumption of the electronic system in response to the signal during the power down to reduce the voltage of the voltage rail.

18. The system of claim 17, wherein the power consumption control system arranged to increase the power consumption comprises the power consumption control system arranged to one or more of increase a clock rate of a subsystem of the electronic system, wake the subsystem of the electronic system from a reduced power state, and perform a read operation of a memory in the electronic system during the power down.

19. The system of claim 17, wherein the voltage is below the power consumption trigger voltage in response to a voltage drop event of a voltage output by a voltage source, the voltage output provided as an input of the power management system.

20. The system of claim 19, wherein based on the voltage of the voltage source being at the nominal voltage after the power down, delaying to provide the regulated voltage to the electronic system, wherein the delay is less than if the power consumption was not increased during the power down.

* * * * *